United States Patent
Kulkarni et al.

(10) Patent No.: US 7,199,210 B2
(45) Date of Patent: Apr. 3, 2007

(54) PROCESS FOR THE PREPARATION OF POLYETHYLENE TEREPHTHALATE (PET)

(75) Inventors: Sanjay T. Kulkarni, Chennai (IN); Harish Bisht, Chennai (IN)

(73) Assignee: Futura Polymers, a division of Futura Polyesters Limited, Chennai (IN)

( * ) Notice: Subject to any disclaimer, the term of this patent is extended or adjusted under 35 U.S.C. 154(b) by 36 days.

(21) Appl. No.: 10/967,302

(22) Filed: Oct. 19, 2004

(65) Prior Publication Data

US 2005/0267285 A1    Dec. 1, 2005

(30) Foreign Application Priority Data

Nov. 28, 2003   (IN) .......................... 974/CHE/2003

(51) Int. Cl.
*C08G 63/02* (2006.01)
(52) U.S. Cl. .................. 528/272; 264/176.1; 264/219; 422/131; 528/271
(58) Field of Classification Search ............. 264/176.1, 264/219; 422/131; 528/271, 272
See application file for complete search history.

(56) References Cited

U.S. PATENT DOCUMENTS

2004/0254330 A1*  12/2004  Duan et al. ................. 528/275

FOREIGN PATENT DOCUMENTS

WO    WO/2003/074612    *  9/2003

* cited by examiner

*Primary Examiner*—Terressa Boykin
(74) *Attorney, Agent, or Firm*—Morrison & Foerster LLP

(57) ABSTRACT

A process for the preparation of polyethylene terephthalate by making use of non antimony catalysts is described. The Ti complex catalyst is pre-dispersed in the polymer matrix selected from PET, PBT, PCTG, PETG, PCT, PEN, PPT, PTT or any other related polyesters and prepared as a master batch. The key feature of the process is that the polyester obtained is having good whiteness, as against the yellowness normally encountered with Ti based catalysts, and also the polyester has very good clarity with minimum haze.

18 Claims, 1 Drawing Sheet

------ *Indicates alternate Ti catalyst addition*

PROCESS FOR THE PREPARATION OF POLYETHYLENE TEREPHTHALATE (PET)

FIELD OF THE INVENTION

Figure 1:
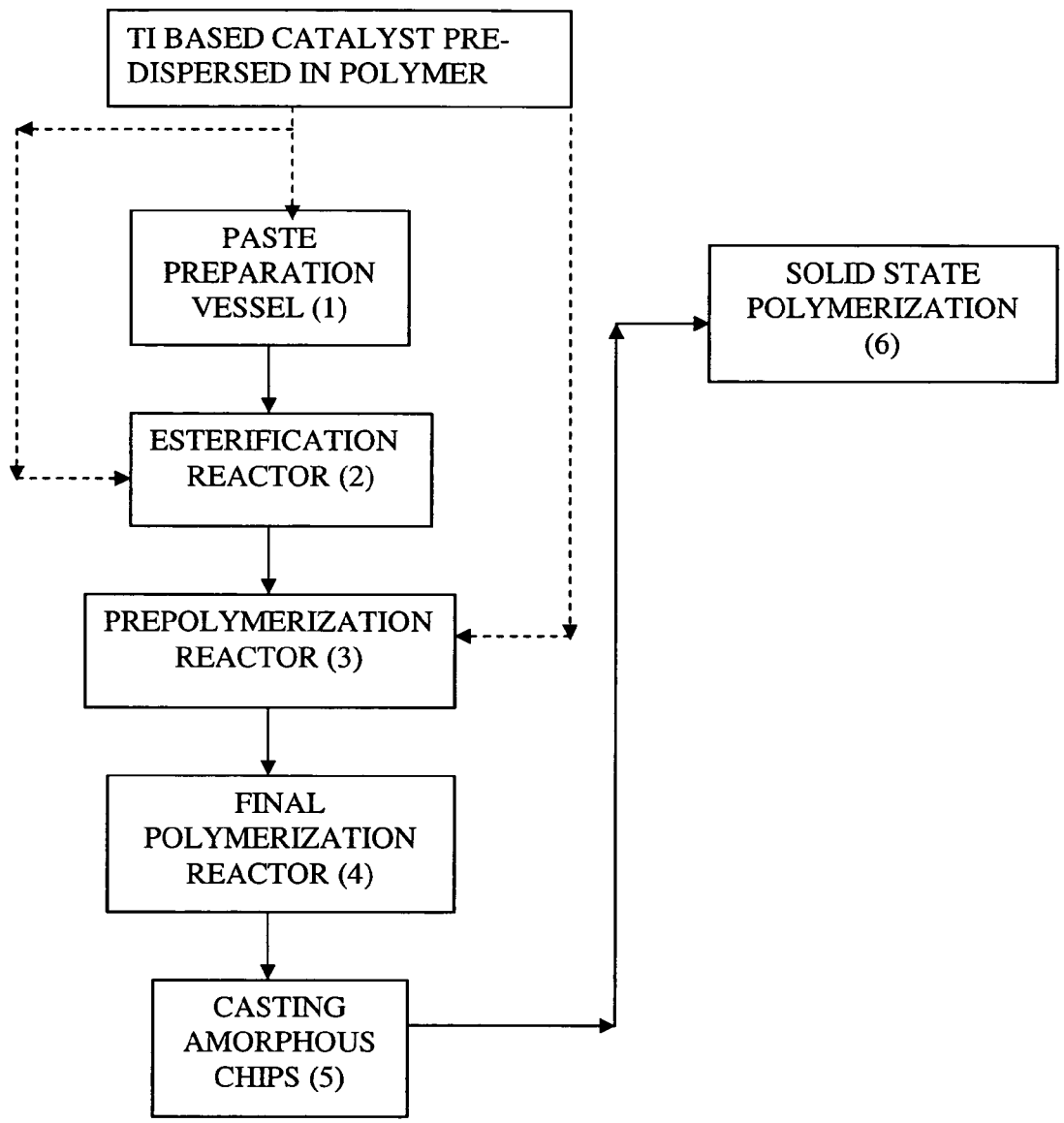

The present invention relates to a process for the preparation of polyethylene terephthalate (PET) in the presence of a polycondensation catalyst master batch. The present invention particularly relates to a process for the preparation of PET, wherein titanium (Ti) polycondensation catalyst complex is pre-dispersed in a polymer matrix to form a master batch to obtain a PET having good clarity and minimum haze.

BACKGROUND AND PRIOR ART

The catalysts normally used in polycondensation to produce polyethylene terephthalate (PET) are predominantly compounds of Antimony (Sb), mostly antimony trioxide and antimony triacetate. Germanium dioxide, though a good catalyst and gives polyester with better clarity, its usage is limited due to its high cost. Off late universally there is a tendency to shift from Sb based catalysts to non Sb catalysts primarily on the basis of its not being too eco friendly. Thus today there is always a preference to work with low levels of Sb catalyst if not totally substituting that with non Sb catalysts.

Among the various alternatives Titanium (Ti) based compounds have been widely suggested though commercially it has not replaced Sb based catalysts mainly because normally Ti imparts yellow coloration to the polyester. Variety of Ti compounds have been suggested and tried as polycondensation catalysts. These include tetra-n-propyl titanate, tetraisopropyl titanate, tetra-n-butyl titanate, tetraphenyl titanate, tetracyclohexyl titanate, tetrabenzyl titanate, tetra-n-butyl titanate tetramer, titanium acetate, titanium oxalates, sodium or potassium titanates, titanium halides, titanate hexafluorides of potassium, manganese and ammonium, titanium acetylacetate, titanium alkoxides, titanate phosphites etc.

EP 0699700, French Patent 2419949, U.S. Pat. Nos. 4,983,711, 3,962,189 and JP52062398 describe production of polyesters using Sb free Ti compounds with addition of Cobalt compounds and Optical brightener but still the color of the polyester had the yellow tinge. Incorporation of extra cobalt and other toners reduce other properties of polymer such as whiteness (L), filterability etc.

U.S. Pat. No. 6,143,837 deals with a process for preparation of polyester resins utilizing Ti alkoxides, acetylacetonates, dioxides and phosphites. Here, though the Ti catalyst is about four times more active than Sb catalyst, in order to overcome the problem of yellow coloration in the polyester addition of cobalt compounds other organic colorants have been suggested. Also the low reactivity of the Ti based catalyst towards solid-state polycondensation (SSP) has been overcome by aromatic dianhydride of a tetra carboxylic acid like Pyromellitic Dianhydride as an additive.

U.S. Pat. No. 6,372,879 deals with polyester polycondensation with Ti based catalyst along with a catalyst enhancer. Typically the composition consisted of titanyl oxalate catalyst and a metallic oxalate catalyst enhancer and as an option Sb based co-catalyst. Here the Titanyl oxalates consisted of a combination of lithium or potassium titanyl oxalates with Sb trioxide, triacetate or trisglycoxide.

U.S. Pat. No. 3,951,886 describe polyester polycondensation with titanyl oxalates leading to polyester with yellow coloration which has been compensated to some extent by adding cobalt based compounds.

U.S. Pat. No. 6,500,915 deals with polyester resin produced with a series of catalysts containing a Ti compound and restricting the addition level such that the rate and color of the polyester are not affected.

U.S. Pat. No. 6,541,598 use a composition consisting of a Ti compound and a complexing agent based on a phosphorous compound and polyester with better color has been claimed.

U.S. Pat. Nos. 6,723,768 & 5,453,479 though use Titanium compounds at low levels like 1 to 30 ppm the process is for a blend of polyester and polycarbonate. Also the catalyst used is a complex of a phosphorous compound and a titanium compound with a molar excess of titanium.

U.S. Pat. No. 6,787,630 deals with titanium catalysts for polyesterification. The process involves esterification followed by the addition of complexing agents comprising phosphorous based compounds followed by cobalt compounds and subsequently a titanium compound is added. Additionally a branching agent and optical brightener are also added if needed. In this work no process time data is mentioned and also the final color of the polymer as represented by the 'L' and 'b' values needs improvement. Their 'L' values are in the range 62 to 67 and most of their 'b' values are in the range 0.77 to 5.89 even in cases where optical brighteners have been used.

EP 1413593 (CA 2451994) uses a product of tetra alkyl titanium compounds along with a phosphorous based compound and an aromatic carboxylic acid and claims a polyester having high 'L' and low 'b' values with reduced acetaldehyde.

OBJECTS OF THE INVENTION

The main object of the present invention is to provide a process for the preparation of polyethylene terephthalate (PET) by using non-antimony polycondensation catalysts like halides and oxalates of titanium in combination with cations like ammonium, lithium, sodium, potassium, calcium, strontium, barium and lead as well as alkali and alkyl titanates and titanates of hexafluoride and acetyl acetates as a master batch in a polyester carrier like PET.

An object of this invention is to either totally or partially replace antimony with titanium as a polycondensation catalyst.

Another object of the invention is to adopt a catalyst addition procedure to provide good color and reduced haze as compared to antimony based polyester.

Yet another object of the invention is to overcome the additional yellow color resulting from the usage of Ti based polycondensation catalysts even in the presence of low levels of addition of Cobalt acetate and color toners.

One more object of the invention is to use a heat stabilizer alone or in combination to achieve a good thermal stability without affecting the polyester color.

SUMMARY OF THE INVENTION

The present invention provides a process for the preparation of polyethylene terephthalate (PET), in the presence of titanium-based poly condensation catalyst, said process comprising the steps of preparing slurry of pure terepthalic acid, mono ethylene glycol, isopthalic acid and reduced quantities of colour toners. Preparing a master batch with an optimal quantity of titanium complex catalyst in a polymer matrix, said polymer matrix selected from polyesters like polyethylene terephthalate (PET), polybutylene terephthalate (PBT), cyclohexanedimethanol (CHDM) modified copolyesters like poly(cyclohexylene dimethylene terephthalate)-Glycol modified polyester (PCTG), poly (ethylene terephthalate)-Glycol modified polyester (PETG), polycyclohexylenedimethylene terephthalate (PCT), polyethylene naphthalate (PEN), polypropylene terephthalate (PPT) or polytrimethylene terepthalate (PTT), or any other related polyesters. The non-antimony polycondensation catalysts used in the present invention are halides and oxalates of titanium in combination with cations like ammonium, lithium, sodium, potassium, calcium, strontium, barium and lead as well as alkali and alkyl titanates and titanates of hexafluoride and acetyl acetates as a master batch in a polymer matrix. Adding the dispersed titanium complex in the polymer matrix to said slurry at a desired temperature, esterifying said slurry in a reduced time period and under controlled degree of polymerisation to obtain a pre-polymer, and retaining a portion of said pre-polymer as pre-polymer heel for subsequent batch reactions, polymerising the pre-polymer in a reduced time period and enhanced degree of polymerisation to obtain a polymer melt, stabilizing said final polymer melt by adding at least a heat stabilizing additive, extruding and converting the final polymer melt to form amorphous pellets under nitrogen pressure and solid-state polymerizing said pellets to obtain polyethylene terepthalate, which is free from yellow colour even in the presence of low levels of addition of Cobalt acetate and color toners. The polyester obtained by the process of the present invention is with good clarity and reduced haze.

BRIEF DESCRIPTION OF THE ACCOMPANYING DRAWING

FIG. 1 describes Schematic Flow Diagram of the process of the present invention.

DESCRIPTION OF THE INVENTION

Accordingly, the present invention provides a process for the preparation of polyethylene terepthalate (PET), where a titanium (Ti) catalyst complex is pre-dispersed in a polymer matrix. The polymer matrix of the present invention is selected from polyesters like polyethylene terephthalate (PET), Polybutylene terephthalate (PBT), cyclohexanedimethanol (CHDM) modified copolyesters like Poly (cyclohexylene dimethylene terephthalate)-Glycol modified polyester (PCTG), Poly (ethyleneterephthalate)-Glycol modified polyester (PETG), polycyclohexylenedimethylene terephthalate (PCT), Polyethylene Naphthalate (PEN), Polypropylene terephthalate (PPT) or Polytrimethylene terephthalate (PTT), or any other related polyesters.

The Process Steps of the Present Invention are as Follows:

Initially, slurry of polyethylene terepthalic acid and mono ethylene glycol (PTA/MEG) in the ratio of 70:30 wt % is prepared in a paste preparation vessel along with the required proportion of isopthalic acid (IPA), in the range of about 0.5–4 wt %. A colour improving compound in the form of Cobalt Acetate in the range of 3–100 ppm, preferably in the range of 10–40 ppm, along with additional red and/or blue toners in the range of 0.2–3 ppm is also added in the paste preparation vessel along with PTA/MEG.

Preparation of Master Batch of Titanium Complex Catalyst

A master batch comprising titanium (Ti) complex catalyst, in the range of 5 to 100 ppm, preferably in the range of 20–50 ppm, most preferably in the range of 30–40 ppm and having a particle size in the range of 20–40 microns, said titanium complex catalyst pre-dispersed in a polymer matrix selected from PET, PBT, PCTG, PCT, PEN, PETG, PPT, PTT or any other related polyesters. The ratio of titanium complex catalyst with the polymer matrix is in the range of 0.1:99.9–5:95, preferably 0.1:99.9–2:98.

Addition of Master Batch to the Reaction Process

The master batch comprising titanium (Ti) complex catalyst is added at a lower temperature in the range of 140–165° C. to PTA/MEG paste. The addition of titanium catalyst in the polymer matrix is performed either during paste preparation, esterification or during pre-polymerisation.

A Typical Batch Processing Takes Place in the Following Manner as Disclosed Below:

Initially, the esterifier is empty and having the temperature of 240–270° C. The reactor is maintained under an inert atmosphere by using the Nitrogen. The reactor pressure is maintained in the range of 0.5–3.0 Kg/cm². The PTA/MEG/IPA pumping was started. After the required quantity of the paste is pumped into the reactor the pumping is stopped.

In the esterification reactor the PTA/IPA gets converted to bishydroxyethylene terephthalate (BHET) i.e. prepolymer or oligomer. Thus the complete mass gets converted to the BHET viz. prepolymer/oligomer with a degree of polymerization in the range of 5–10.

The Ti complex catalyst, in the desired quantities as cited above is pre-dispersed in a polymer matrix selected from PET, PBT, PCTG, PETG, PCT, PEN, PPT, PTT or any other related polyesters is added to PTA/MEG paste. The addition of titanium catalyst in the polymer matrix is performed either during paste preparation, esterification or during pre-polymerisation.

After getting this first batch converted, a part of the BHET remains in the esterifier and acts as the pre-polymer heel. This helps to hasten all the above-mentioned unit process in the subsequent batches. As a result, the time period in the esterification reactor is reduced up to 14%.

After achieving the desired end temperature in the range of 255–275° C. and the conversion of 98.5% of the batch processing, the pre-polymer is filtered through a 20 micron filter and transferred to the prepolyreactor under nitrogen pressure in the case of three reactor system or directly to the autoclave in the case of two reactor system. The prepolyreactor is equipped with an agitator, internal heating coil and external limpet coil. The pre-polymer is processed by gradually reducing the pressure to 5–15 mbar and increasing the temperature to about 260–285° C. After an increase in DP the melt is transferred after filtration to the Polymerization reactor, which is provided with a special agitator, condenser and a fine vacuum system. The polymerization takes place in the presence of catalyst viz. Ti based compounds in a reduced time period which is up to 26% as compared to known processes.

Simultaneously, the DP is also enhanced up to 100–110 by reducing the pressure to as low as 0.1–0.5 mbar (abs.) and the temperature at about 292–298° C. to obtain a final polymer melt. The final polymer melt is stabilized with a single or a combination of heat stabilizers Phosphorous Acid/OrthoPhosphoricAcid (OPA)/Triethylphosphonoacetate (TEPA) by maintaining the Phosphorous content between 5 and 100 ppm, preferably in the range of 30 to 70 ppm. The polymer melt is extruded under nitrogen pressure and converted into pellets. This amorphous copolyester resin is further solid state polymerized to an IV of 0.80–0.86. The resulting solid state polymer is free from yellow colour. The improvement in the color of PET is as a result of finely dispersing titanium compound catalyst in the selected polymer matrix and adding said polymer matrix at the cited low temperature to the reaction mixture, in the presence of the limited amount of selected cobalt compound and the toners.

The solid stated polymer apart from its other applications is primarily used for stretch blow molded bottles via the process of injection molding of performs. In a similar way continuous process is carried out in number of reactors ranging from 3–5.

In the present invention Ti based non-antimony catalyst is used to obtain the polyester with excellent color and clarity without using additional levels of cobalt compounds or color toners. This is achieved by pre-dispersing the Ti complex catalyst in a polyester matrix to obtain a master batch of titanium complex catalyst and the selected polymer matrix. The master batch is then added in the PTA/MEG paste, during esterification or during pre-polymerization., and the low temperature. Same results are achieved even with part replacement of Sb with Ti. The end product obtained by using the process of the present invention produces a polyester (PET) having good clarity with minimum haze. Therefore, by adopting the process steps of the present invention, a total replacement of titanium based catalysts is achieved. However, wherever necessary a partial replacement of antimony with titanium can also be performed.

The invention is further explained in the form of following examples. However, these applications should not be considered as limiting the scope of the invention, since these examples are exemplary in nature.

Specification of Color Toners:

Blue Toner: Labeled as POLYSYNTHRIN BLUE RBL procured from Clariant India Limited or similar Food Grade approved special blue toner.

Red Toner: Labeled as POLYSYNTHRIN RED GFP procured from Clariant India Limited or similar Food Grade approved special red toner.

EXAMPLE 1

Slurry of 10.16 kg of pure terepthalic acid (PTA) along with 0.24 kg of isopthalic acid (IPA) are reacted together with 4 litres of monoethylene glycol (MEG) and prepared as a paste in a paste preparation vessel. A master batch of 0.1–5% of Potassium Titanium Oxide Oxalate pre-dispersed in a PET Polymer matrix is prepared. The quantity of Ti complex present as a master batch is used is in the range of 5–40 ppm as Titanium in this example. Suitable quantities of antimony compound (in the range of 100–310 ppm) are added wherever necessary. The time of addition of this Ti catalyst and/or antimony is varied to observe its effect on the color of the polymer. Cobalt Acetate in the range of 20–70 ppm, is added in the paste preparation vessel along with PTA/MEG. Different levels of Cobalt acetate are used to improve the color in the absence of colour toners. Esterifying the slurry in a reduced time period of 200 minutes, followed by controlled degree of polymerisation between 5 and 10 to obtain a pre-polymer bishydroxy ethylterephthalate (BHET). The esterification pressure is maintained at 2 bar. A portion of the BHET/prepolymer formed is retained in the esterification reactor to act as pre-polymer heel. The pre-polymer is polymerized in the poly reactor to a higher degree of polymerisation viz.100–110 to obtain the polymer melt. A proportionate amount of heat stabilizer in the form of combination of phosphoric acid (OPA) and Triethylphosphonoacetate (TEPA) mixture in the ratio of 15:20 ppm is added to the polymer melt to obtain the final stabilized polymer melt. The final polymer melt is extruded and converted into amorphous pellets under nitrogen pressure. Finally, Solid State Polymerisation (SSP) is performed on the pellets to obtain PET of I.V. of 0.80 to 0.86 which is free from yellow colour.

The results of number of experiments conducted by following the process steps of Example 1 are tabulated the following Table 1.

TABLE 1

Properties of Amorphous & Solid State Polymer (SSP) samples based on Example 1

| | ADDITIVES LEVELS (PPM) | | | | | | POLYMER PROPERTIES | | | | | | |
|---|---|---|---|---|---|---|---|---|---|---|---|---|---|
| EXP No. | Sb ppm | Ti ppm | Co ppm | HS ppm | E T | P T | P.E.T | Amorphous I.V. dl/g | COOH meq/kg | L* | b* | H | SSP I.V dl/g |
| 1 | 310 | NIL | 70 | 65 | 160–263 | 288 | 281–282 | 0.6–0.64 | 15–20 | 68 | −6 | 15 | 0.9 |
| 2 | 300 | NIL | 65 | 39 | — | 287 | 281 | 0.62 | — | 70.9 | −8 | 7.3 | — |
| 3 | 100 | 20 | 65 | 65 | 160–263 | 288 | 281–282 | 0.63 | 20 | 72 | −7.4 | 0.6 | 0.82 |
| 4 | 300 | 20 | 20 | — | 160–263 | 288 | 281 | 0.64 | 21 | 57 | 4.5 | — | — |
| 5 | 100 | 20 | 40 | 24 | 160–263 | 288 | 283 | 0.63 | 18 | 73 | −4.7 | 0.4 | 0.85 |
| 6 | 100 | 10* | 50 | 30 | — | 288 | 284 | 0.63 | — | 70.3 | −8.3 | 5.6 | — |
| 7 | NIL | 40 | 40 | 24/65 | 160–264 | 288 | 282 | 0.63 | 21 | 72 | 7 | 0.4 | 0.76 |
| 8 | NIL | 25 | 45 | 27** | — | 287 | 281 | 0.62 | — | 69.3 | −9.5 | 8.2 | — |
| 9 | 200 | 5* | 55 | 33* | — | 287 | 281 | 0.63 | — | 71.6 | −7.9 | 6 | — |

In all experiments (except those marked *) the Ti complex catalyst was added initially with the raw materials.
EXP NO—Experiment Number
*Ti complex catalyst added after esterification
**Ti complex catalyst added along with the heat stabilizer
L* b* are CIE values.
HS—Heat Stabilizers
E T—Esterification Temperature
P T—Polyreaction Temperature
P.E.T—Poly end Temperature
H—Haze values
SSP—Solid State Polymer Partial replacement of antimony with Ti complex catalyst keeping Cobalt compound in the medium level has resulted in good color and clarity of the polymer. Initial addition of the Ti complex catalyst gives better color in the polymer. Full replacement of antimony by titanium leads to an increase in 'L' value by about 5 to 10%.

EXAMPLE 2

This example adopts the process steps of Example 1. But in addition to the cobalt compound, red and blue toners are used in the range of 1.5–2.0 ppm for improving the color. In the present example antimony based catalyst is totally replaced by Ti complex catalyst in the range of 20–95 ppm as titanium, pre-dispersed in PET polymer matrix. The results as obtained by executing process steps of Example 2 are tabulated in Tables 2.

TABLE 2

Properties of Amorphous Polymer based on Example 2

| EG. No. | Ti ppm | Addition mode | Co ppm | T | HS ppm | E T | P.P.T | P.E.T | I.V. dl/g | L* | b* | H |
|---|---|---|---|---|---|---|---|---|---|---|---|---|
| 1 | 20 | Initial | — | 1.5 | 36 | 162–266 | 287 | 281 | 0.60 | 76.1 | −2.1 | 4 |
| 2 | 20 | Initial | 10 | 1.5 | 54 | " | " | " | 0.61 | 72.9 | −2.8 | 3.9 |
| 3 | 20 | After esterification | 10 | 1.5 | 54 | " | " | " | 0.62 | 73.5 | −0.05 | 4.6 |
| 4 | 25 | Initial | 20 | 2 | 54 | " | " | " | 0.60 | 68 | −7.2 | 4.2 |
| 5 | 35 | Initial | 15 | 2 | 54 | " | " | " | 0.62 | 69 | −1.6 | 7.2 |
| 6 | 95 | Initial | 40 | — | 25 | " | " | " | 0.61 | 71.7 | −7.8 | 3.7 |

L* b* are Commission Internationale de l'eclairage of France (CIE) values CIE values.
T—Toners
HS—Heat Stabilizers
E T—Esterification Temperature
P.P.T—Peak Poly Temperature
P.E.T—Poly end Temperature
I.V—Intrinsic Viscosity
H—Haze (NTU) Values give an indication of the clarity of the polymer melt whose magnitude will affect the products of application. Therefore, the lesser values are preferred.

It is observed (refer Example No. 1) that Ti compound catalyst addition in the initial stages along with the toner, keeping cobalt compound minimum or nil and heat stabilizer with P content in the medium level results in the polymer with better color and reduced processing times. The increase in 'L' value is in the range of 7 to 12% depending on the cobalt and heat stabilizer levels. The esterification process time reduction is in the range of 14% and the reduction in polycondensation process time is in the range of 26%.

EXAMPLE 3

The process steps as disclosed in Example 1 are repeated and the amorphous polymer obtained with Ti compound catalyst is Solid State Polymerized (SSP) and the Intrinsic Viscosity I.V increase with time is compared with normal antimony catalysed processes.

Even though Ti compound catalyst shows an improvement in color and melts processing times, it results in marginal to significant drop in the SSP rate depending upon the replacement of antimony and the introduction of titanium and cobalt levels. The SSP rate reduction is in the range 6–26%. The details of the results are tabulated in Table 3 for Amorphous Polymer and the results of SSP are tabulated in Table 4.

TABLE 3

Properties of Amorphous Polymer based on Example 3

| EG. No. | Sb ppm | Ti ppm | Co ppm | 'P' ppm | P.C.T | I.V. Dl/g | L* | b* | H |
|---|---|---|---|---|---|---|---|---|---|
| 1 | 100 | 15 | 30 | 49 | 235 | 0.585 | 71.1 | −6.3 | 6.7 |
| 2 | 300 | — | 60 | 54 | 206 | 0.619 | 71.9 | −6.8 | 13.1 |
| 3 | — | 25 | 90 | 54 | 338 | 0.595 | 70.6 | −9.3 | 4.2 |
| 4 | — | 30 | 60 | 54 | 213 | 0.618 | 68.1 | −9.3 | 2.9 |
| 5 | — | 40 | 40 | 36 | 240 | 0.610 | 66.6 | −6.2 | 4.0 |

L* b* are Commission Internationale de l'eclairage of France (CIE) values.
P—Phosphorus as heat stabilizing agent
P.C.T—Poly Cycle Time
I.V—Intrinsic Viscosity
H—Haze (NTU) Values give an indication of the clarity of the polymer melt whose magnitude will affect the products of application. Therefore, the lesser values are preferred.

TABLE 4

Properties of SSP Polymer samples based on Example 3

| EG. No. | ADDITIVES LEVELS PPM | | | | POLYMER PROPERTIES | | | | | |
|---|---|---|---|---|---|---|---|---|---|---|
| | Sb ppm | Ti ppm | Co ppm | 'P' as HS ppm | Poly cycle time | I.V. dl/g | L* | b* | IV rise/hr | H ntu |
| 1 | 100 | 15 | 30 | 49 | 235 | 0.835 | 78.8 | −2.2 | 0.0089 | 6.0 |
| 2 | 300 | — | 60 | 54 | 206 | 0.762 | 74 | −4.4 | 0.0095 | 12.0 |
| 3 | — | 25 | 90 | 54 | 338 | 0.7 | 73.3 | −7 | 0.0070 | 3.9 |
| 4 | — | 30 | 60 | 54 | 213 | 0.725 | 70.2 | −8.1 | 0.0071 | 2.7 |
| 5 | — | 40 | 40 | 36 | 240 | 0.730 | 70.3 | −4.8 | 0.0080 | 4.1 |

Replacement of antimony by titanium based catalyst improves the SSP rate by about 6 to 26% depending upon the amount of titanium catalyst and the extent by which it replaces antimony. The typical properties of the Polymer as obtained by using the process of the present invention are provided in Tables 5 and 6.

TABLE 5

Typical properties of the Polymer: AMORPHOUS - Copolyester

| | |
|---|---|
| I.V. | 0.600 ± 0.04 dl/g |
| COOH end groups | 30 ± 5 meq/kg |
| DEG | 1.0 ± 0.1 wt. % |
| Melting Point | 246 ± 2° C. |
| L*(CIE) | Min. 70 ± 2 |
| 'b' | Max −5.5 ± 1.0 |
| Haze | <4 |

TABLE 6

SSP RESIN COPOLYESTER

| | |
|---|---|
| IV | 0.800 ± 0.02 dl/g |
| COOH end groups | <30 meq/kg |
| DEG | 1.0 ± 0.1 wt. % |
| Melting Point | 246 ± 2° C. |
| L*(CIE) | Min. 75 ± 2 |
| 'b' | Max 0 |
| Haze | <4 |

COOH—Carboxyl (COOH) group levels and its consistency are also an indication of the quality of the polymer and its thermal stability.
DEG—Diethylene Glycol (DEG), which is generated from MEG, and its % depends on the initial MEG amount and the temperature profile of the process and the acidic nature of the batch, particularly in the esterification stage. Lower value is preferred as the level of DEG affects the polymer quality.
Haze (NTU) Values give an indication of the clarity of the polymer melt whose magnitude will affect the products of application. Therefore, the lesser values are preferred.

Accordingly, it can be seen here that the usage of antimony results in higher (>4) haze values in the polymer. On the contrary the titanium compound pre-dispersed in a polymer matrix as a master batch and added initially under controlled temperature conditions results in polymer of lower haze.

The polyester polymer produced with this process has applications in fields of textile, industrial yarns, bottle grade plastics etc.

Advantages

1. In the present invention, by way of using titanium compound catalyst pre-dispersed in a polymer matrix it is possible to replace antimony either in part or completely.

2. The process of the present invention provides a better color in the polymer product without the usual yellow color encountered with other titanium catalysts.

3. The titanium catalyst pre-dispersed in a polymer matrix of the present invention also helps in increasing the Solid State Polycondensation (SSP) rate.

We claim:

1. A process for the preparation of polyethylene terephthalate (PET), said process comprising the steps of;
   (a) preparing a slurry of pure terephthalic acid, mono ethylene glycol, isopthalic acid in the presence of reduced amount of a cobalt compound and colour toners,
   (b) pre-dispersing an optimal quantity of a potassium titanium oxide oxalate-containing catalyst in a polymer matrix to obtain a master batch adding the dispersed titanium complex in the polymer matrix from the master batch to said slurry, at a desired temperature and at selected stages of the process,
   (c) esterifying said slurry in a reduced time period and under controlled degree of polymerisation to obtain a pre-polymer, and retaining a portion of said pre-polymer as pre-polymer heel for subsequent batch reactions,
   (d) polymerising the pre-polymer in a reduced time period and enhanced degree of polymerisation to obtain a polymer melt,
   (e) stabilizing said final polymer melt by adding at least a heat stabilizing additive, and
   (f) extruding and converting the final polymer melt to form amorphous pellets under nitrogen pressure and solid-state polymerizing said pellets to obtain polyethylene terephthalate, said polymer free from yellow colour.

2. The process as claimed in claim 1, wherein the colour improver is selected from cobalt compounds, preferably cobalt acetate in the range of 3–100 ppm.

3. The process as claimed in claim 2, wherein the cobalt compound is cobalt acetate in the range of 10–40 ppm.

4. The process as claimed in claim 1, wherein the red and/or blue toners are in the range of 0.2–3 ppm.

5. The process as claimed in claim 1, wherein the ratio of the potassium titanium oxide oxalate-containing and polymer matrix in the master batch is 0.1:99.9–5:95, preferably 0.5:99.5–2:98.

6. The process as claimed in claim 1, wherein the potassium titanium oxide oxalate-containing catalyst is in the range of 5–100 ppm.

7. The process as claimed in claim 6, wherein the potassium titanium oxide oxalate-containing catalyst is in the range of 20–50 ppm.

8. The process as claimed in claim 6, wherein the potassium titanium oxide oxalate-containing catalyst is in the range of 30–40 ppm.

9. The process as claimed in claim 1, wherein the polymer matrix is selected from PET, polyethylene terephthalate (PET), Polybutylene terephthalate (PBT), Poly(cyclohexylene dimethylene terephthalate)-Glycol modified polyester (PCTG), Poly(ethylene terephthalate)-Glycol modified polyester (PETG), polycyclohexylenedimethylene terephthalate (PCT), Polyethylene Naphthalate (PEN), and Polypropylene terepthalate (PPT) or Polytrimethylene terepthalate (PTT), or any other related polyesters.

10. The process as claimed in claim 1, wherein the addition of potassium titanium oxide oxalate-containing catalyst in the polymer matrix is performed either during slurry preparation, esterification or during pre-polymerisation.

11. The process as claimed in claim 1, wherein the potassium titanium oxide oxalate-containing catalyst is pre-dispersed in the polymer matrix is added in the reactor at a temperature in the range of 140–165° C.

12. The process as claimed in claim 1, wherein the reduced time period in the esterification reactor is up to 14%.

13. The process as claimed in claim 1, wherein the controlled degree of polymerisation is in the range of 5–10.

14. The process as claimed in claim 1, wherein the pre-polymer is bishydroxyethyl terephthalate (BHET).

15. The process as claimed in claim 1, wherein the reduction in polycondensation process time is up to 26%.

16. The process as claimed in claim 1, wherein the enhanced degree of polymerisation is in the range of 100–110.

17. The process as claimed in claim 1, wherein the heat stabilizing additive is selected from phosphorous acid, orthophosphoric acid (OPA) or triethylphosphonoacetate (TEPA) or a combination thereof and preferably a combination of OPA & TEPA.

18. The process as claimed in claim 1, wherein the process is performed either in batch processing or continuous processing.

* * * * *